Patented Mar. 26, 1974

3,799,975
PROCESS FOR ISOLATING DOPA

Ado Kaiser, Neu-Frenkendorf, Wolfgang Koch, Riehen, Marcel Scheer, Basel, and Uwe Wolcke, Bottmingen, Switzerland, assignors to Hoffmann-La Roche Inc., Nutley, N.J.
No Drawing. Filed Oct. 12, 1971, Ser. No. 188,593
Claims priority, application Switzerland, Oct. 30, 1970, 16,051/70
Int. Cl. C07c *101/72*
U.S. Cl. 260—519         19 Claims

ABSTRACT OF THE DISCLOSURE

A process for isolating dopa in substantially pure form from an aqueous medium containing water insoluble impurities by forming a complex of L-dopa with a boric acid or a borate salt.

BACKGROUND OF THE INVENTION

Dopa which has the formula:

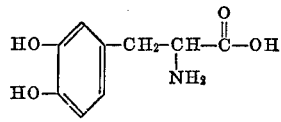

has been known for many years to be an intermediate in the biological pathway from tyrosine to epinephrine. Quite recently, L-dopa, the L-enantiomorph of the racemate of dopa, has been found to be a remarkably effective therapeutic agent in the treatment of Parkinson's disease. Until this finding, sufferers of Parkinson's disease relied upon only hit or miss symptomatic drug therapy or on surgical procedures in the hope of relief from the effects of this disease. Unfortunately, neither symptomatic drug therapy nor surgical procedures generally resulted in more than a temporary retardation from the effects of this serious malady. The art has long recognized the pressing need for a medicament which would serve to control this chronic disease. However, the recent finding that L-dopa is effective in the treatment of Parkinson's disease has buoyed the hope of many.

In order to obtain the maximum beneficial effects of L-dopa as medicament in the treating of Parkinson's disease, the L-dopa should be chemically as pure as possible. In view of the need for the repeated use of this compound in relatively high doses to treat Parkinson's disease, even small amounts of chemical impurities could cause undesirable side effects. In view of this, L-dopa suitable for treating Parkinson's disease is in short supply.

Dopa usually contains water insoluble contaminates such as α-amino acids which are utilized as starting materials. The most common water insoluble α-amino acid starting materials are tyrosine and phenyl alanine. For instance, in the manufacture of L-dopa from L-tyrosine by fermentation [J. Am. Chem. Soc., 91; (1969)] the L-dopa is produced in admixture with L-tyrosine. An approximately quantitative preparative isolation of L-dopa from these mixtures has only been possible with considerable effort (for example, by chromatography on ion-exchange columns or by forming derivatives thereof) and high costs. Therefore, there exists a need for providing a simple method for isolating L-dopa from mixtures containing e.g. L-tyrosine and/or phenylalanine as impurity.

SUMMARY OF THE INVENTION

In accordance with this invention, it has been found that dopa can be readily isolated in substantially pure form from a mixture with water insoluble impurities by first treating the mixture in an aqueous medium with boric acid or a borate salt while the medium is at a pH of at least about 7.0 to form a complex of dopa and boric acid which is water soluble and then separating the water insoluble impurities from the aqueous medium containing the complex dissolved therein while the pH of the medium is at a value of at least about 7.0 and which is sufficient to maintain substantially all of the impurities in water insoluble form. The dopa can be isolated from the aqueous medium in substantially pure crystalline form by hydrolysis with an acid.

In the case of where the impurities are tyrosine or phenylalanine, the pH of the aqueous medium during separation should be at a value of from about 7.0 to about 8.5. It is within this pH range that these impurities are insoluble in the aqueous medium. Where it is desired to separate other impurities from L-dopa, the separation step should, in accordance with this invention, take place at a pH value above 7. The precise pH range above 7 will depend upon the pH range at which the impurities are water insoluble.

In accordance with this invention it has been found that dopa can be readily and easily isolated from mixtures containing water insoluble impurities by means of forming a complex with boric acid. It has been found that upon treatment with boric acid or a borate salt at a pH of at least about 7.0, dopa forms a water soluble complex whereas no complex forms with other water insoluble impurities such as phenyl alanine and tyrosine. Therefore, the dopa dissolves in the water in complex form leaving tyrosine and phenyl alanine as an undissolved precipitate.

The present process, which is particularly important for the production of the pharmacodynamically valuable L-dopa produces dopa which is substantially free from the aforementioned impurities in a simple and inexpensive manner. An additional advantage lies in the fact that the dopa is largely protected against the action of atmospheric oxygen by the complex formation and the oxidative degradation in the process is therefore limited to a minimum.

DETAILED DESCRIPTION OF THE INVENTION

In the first step of the process of this invention, the mixture containing dopa and the water insoluble impurities is treated in an aqueous medium with boric acid or a borate salt at a pH of at least about 7. This treatment converts the dopa in the mixture to a water soluble complex of dopa with boric acid. The treatment with boric acid or with a borate salt can be carried out at any pH of from about 7 to about 14. Generally, it is preferred to carry out the formation of the boric acid-dopa complex at a basic pH range, below which the impurities are substantially insoluble. Generally, in the case where the impurity is tyrosine or phenylalanine, it is preferred to form the complex at a pH of from 10 to 12. By carrying out the formation of the complex at this high pH range, the conversion of dopa to the complex proceeds as completely as possible. However, at this high pH range, some of the impurities which are to be separated off such as tyrosine remain in solution. Therefore, when the treatment is carried out at this high pH range, it may be necessary to lower the pH so that the impurities precipitate.

When the formation of the complex takes place at a basic pH range, below which the impurities are substantially insoluble, the pH may then be lowered to a value which is above 7 and which is sufficient to maintain substantially all of the impurities in water insoluble form. In the case where the impurity is tyrosine or phenylalanine and the complex was formed at a pH of from about 10 to 12 or above, separation can take place at a pH of about 7 to 8.5. In any case, care must be taken to prevent the pH from falling to a value of below 7 during the step of forming the complex and separating the complex from the water soluble impurities. This is true since at a pH level of below about 7, the soluble dopa-boric acid complex is broken down and dopa precipitates.

On the other hand, the treatment of dopa with boric acid or a borate salt to form the complex can take place at a pH range of above about 7 and within which substantially all imprities are water insoluble. In the case where the impurity is tyrosine or phenylalanine, the formation of the complex can take place at a pH lower than 10, i.e., from about 7 to 10. In the case where the complex is formed at a pH of above about 7 and within the range where substantially all of the impurities are in their water insoluble form, there is no need to lower the pH value during the step of separating the water insoluble impurities from the aqueous medium. This is true since the water insoluble impurities remain as a precipitate.

In carrying out the formation of the complex, boric acid or any borate salt can be utilized. Among the borate salts which can be utilized are included the alkali metal borates such as sodium borate, potassium borate, etc.; the alkali metal metaborates such as sodium meta-borate; and the alkali metal pentaborates such as potassium penta-borate. The preferred borate salt is borax (sodium borate). In forming the complex, one mole of boric acid or the borate salt can be utilized per mole of the dopa contained within the mixture. However, if desired, the boric acid or borate salt can be present in excess of the stoichiometric amount required to react with the dopa in the mixture. Generally, it is preferred to utilize the boric acid or the borate salt in excess of the stoichiometric amount.

The formation of the complex is carried out in an aqueous solution. In forming the complex, temperature and pressure are not critical and the complex can be formed at room temperature and atmospheric pressure. Higher or lower temperatures can be utilized. Generally, it is preferred to carry out the formation of the complex at a temperature of from about 0° C. to about 70° C.

As pointed out hereinabove, the complex can be formed at a pH of above about 7. Any means can be utilized for providing the aqueous medium with a pH of above about 7 during the formation of the complex. One means for providing a pH of above about 7 is by adding a base to the aqueous medium. Any base which will provide a pH of above about 7 can be utilized. The choice of base will depend upon the desired pH of the aqueous medium during the formation of the complex. Among the preferred bases are included alkali metal hydroxides such as sodium hydroxide or potassium hydroxide.

The separation step is carried out at a pH which is at a value of above 7 and is sufficient to maintain substantially all of the impurities in water insoluble form. The upper pH limit used in the separation step will depend upon the precise impurities and the pH in which they dissolve in an aqueous medium. Where the impurities are substantially insoluble over the whole pH range of from about 7 to 14, any pH of about 7 to 14 can be utilized during the separation step. On the other hand, in the case of tyrosine and phenylalanine, which become water soluble at higher pH's, the pH during separation should be maintained at a level of from about 7.0 to 8.5. When the pH of the aqueous medium during the step of formation is at a value above about 7 and above the value where the impurities are water insoluble, the pH can be lowered by the addition of an acid. Any acid that can lower the pH of the aqueous medium to this range can be utilized. Among the acids which can be utilized are included the inorganic acids such as hydrochloric acid, sulfuric acid, carbonic acid; and organic acids such as acetic acid, oxalic acid or tartaric acid.

Upon lowering the pH of the aqueous medium to a value above 7 and sufficient to maintain substantially all of the impurities in water insoluble form, impurities which do not form a water soluble boric acid complex precipitate in the solution or remain undissolved. Complete precipitation of the impurities can be achieved in a conventional manner. For example, the aqueous medium containing the impurities can be cooled to 0° C. Furthermore the aqueous medium containing these impurities can be allowed to stand at about 0° C. for a prolonged period (48 hours or longer). The precipitate obtained which consists of the water insoluble impurities such as the α-amino acids.

Tyrosine and phenylalanine can be separated from the aqueous solution containing the dopa-boric acid complex by any conventional means. Among the methods of separation are included decantation or filtration.

The filtrate obtained can subsequently be subjected to acidic hydrolysis to liberate dopa from the complex. This acid hydrolysis is preferably carried out at a pH of from about 1 to 5, preferably 3 to 5. By this hydrolysis, the dopa-boric acid complex is cleaved and dopa crystallizes out. Any conventional method of acidic hydrolysis can be utilized to cleave the complex and crystallize dopa from the aqueous medium. In carrying out this acidic hydrolysis, any conventional acid can be employed. Among the conventional acids are the mineral acids such as sulfuric acid, hydrochloric acid, polyphosphoric acid, etc. If desired, this hydrolysis can be carried out with organic acids such as the mono- or poly basic-lower alkane carboxylic acids, such as formic acid, acetic acid, citric acid, tartaric acid, oxalic acid, trichloro-acetic acid or trifluoroacetic acid. In carrying out this hydrolysis reaction, temperature and pressure are not critical and this hydrolysis can be carried out at room temperature and atmospheric pressure. If desired, higher or lower temperatures can be utilized. Generally, it is preferred to carry out this hydrolysis at a temperature of from about 0° C. to about 70° C.

The isolation of dopa in crystalline form can be completed in a conventional manner, for example, by cooling to almost 0° C. as well as by prolonged standing at this temperature (for 8 hours or longer).

The crystalline dopa can be isolated in a conventional manner, for example, by filtration and washing off of the crystals with an inert solvent, preferably with water, followed by drying in a conventional manner (with an ethanol-diethyl ether mixture). If desired, the dopa thus produced can be recrystallized from an inert solvent, preferably from water.

If dopa is separated from the other amino acids by this method, the dopa can be resolved to L-dopa by conventional means. On the other hand, if D-dopa is produced by this method, the D-dopa can be racematized to D,L-dopa and the D,L-dopa can be resolved to L-dopa by conventional means.

It is understood that the following example is representative but not limitative of the foregoing invention. All temperatures stated are in degrees centigrade.

EXAMPLE 1

50 g. (0.258 mole) of L-dopa and 50 g. (0.275 mole) of L-tyrosine as well as 450 ml. of 2 N aqueous sodium hydroxide are added at room temperature under an argon atmosphere to a solution of 24.5 g. (0.064 mole) of borax in 600 ml. of water. Carbon dioxide is introduced into the brown clear solution until the pH falls to 7.8. The L-tyrosine already begins to crystallize out during the introduction. The mixture is then cooled to 4° C. for 12 hours. The precipitated crystals are filtered off and successively washed with 100 ml. of water, three times 100 ml. of ethanol and twice 100 ml. of diethyl ether and then dried to constant weight at 70° C./12 mm. Hg. 48.5 g. (97% by weight) of L-tyrosine are obtained as colorless crystals which contain less than 1% by weight L-dopa; melting point 301°–304° C. (decomposition); $[\alpha]_D^{25} = -10.6°$ (c.=1% in 1 N aqueous hydrochloric acid).

The filtrate, combined with the wash water, is brought to pH 4.8 with concentrated aqueous hydrochloric acid and cooled to 4° C. for 16 hours. The precipitated crystals are filtered off and successively washed with 100 ml. of water, twice 100 ml. of ethanol and twice with 100 ml. of diethyl ether and then dried to constant weight at 70° C./12 mm. Hg. 42.2 g. of L-dopa are obtained as grey colored crystals of melting point 287–289° C. (decomposition); $[\alpha]_D^{25} = -11°$ (c.=1% in 1 N aqueous hydrochloric acid). A further 2 g. of L-dopa identical with the main fraction can be isolated from the mother liquor. Overall yield 88% by weight. The dopa thus isolated contains about 3% by weight L-tyrosine.

We claim:

1. A process for separating dopa from a mixture with water insoluble impurities comprising α-amino acid starting materials for dopa, said process comprising treating the mixture in an aqueous medium with boric acid or a borate salt at a pH of at least 7 to form a water-soluble complex of dopa and boric acid and separating the water insoluble impurities from the aqueous medium containing the complex dissolved therein while the pH of the medium is at a value of at least about 7.0 and which is sufficient to maintain substantially all of the impurities in water-insoluble form.

2. The process of claim 1 wherein the impurities contain α-amino acid selected from the group consisting of tyrosine and phenylalanine.

3. The process of claim 2 wherein said α-amino acid is tyrosine.

4. The process of claim 1 wherein the dopa is L-dopa.

5. The process of claim 1 wherein said mixture is treated with boric acid or borate salts at a basic pH range, said range being above the pH range where substantially all of the impurities are in their water-insoluble form.

6. The process of claim 5 wherein the pH, during the separation step, is obtained by the addition of an acid to the aqueous medium.

7. A process for producing substantially pure crystalline L-dopa from a mixture with water insoluble impurities comprising α-amino acid starting materials for dopa, said process comprising treating said mixture in an aqueous medium with boric acid or a borate salt while the pH of the medium is at a value of at least 7.0 to form a water soluble complex of dopa and boric acid, separating the water insoluble impurities from the aqueous medium containing the complex dissolved therein while the pH of the medium is at a value of at least 7.0 and which is sufficient to maintain substantially all of the impurities in water insoluble form and hydrolyzing said complex in said separated aqueous medium with an acid to produce dopa as a crystalline precipitate.

8. The process of claim 7 wherein said hydrolysis is carried out at a pH of 3 to 5.

9. The process of claim 7 wherein the impurities contain α-amino acid selected from the group consisting of tyrosine and phenylalanine.

10. The process of claim 9 wherein said α-amino acid is tyrosine.

11. The process of claim 7 wherein the dopa is L-dopa.

12. The process of claim 7 wherein said mixture is treated with boric acid or borate salts at a basic pH range, said range being above the pH range where substantially all of the impurities are in their water insoluble form.

13. The process of claim 12 wherein the pH during the separation step is obtained by the addition of an acid to the aqueous medium.

14. A process for separating dopa from a mixture with water insoluble impurities comprising α-amino acid starting materials for dopa, said process comprising treating the mixture in an aqueous medium with boric acid or a borate salt at a pH of at least 7 to form a water soluble complex of dopa and boric acid and separating the water insoluble impurities from the aqueous medium containing the complex dissolved therein while the pH of the medium is at from 7.0 to 8.5.

15. The process of claim 14 wherein the impurities contain α-amino acid selected from the group consisting of tyrosine and phenylalanine.

16. The process of claim 15 wherein said α-amino acid is tyrosine.

17. The process of claim 14 wherein the dopa is L-dopa.

18. The process of claim 14 wherein said mixture is treated with boric acid or borate salts at a pH of at least 10 and the separation is carried out at a pH of from 7 to 8.5.

19. The process of claim 18 wherein the pH of 7 to 8.5 is obtained by the addition of an acid to the aqueous medium.

References Cited

UNITED STATES PATENTS 3,592,843    7/1971    Brossi et al. _____ 260—519

OTHER REFERENCES

Chemical Abstracts, vol. 55, 11525h (1961).

LORRAINE A. WEINBERGER, Primary Examiner

P. J. HAGAN, Assistant Examiner